United States Patent [19]

Aronoff et al.

[11] 3,911,192

[45] Oct. 7, 1975

[54] COATED WIRE PRODUCTS

[75] Inventors: Elihu J. Aronoff, Framingham; Kewal Singh Dhami, Shrewsbury, both of Mass.

[73] Assignee: International Telephone and Telegraph Corporation, New York, N.Y.

[22] Filed: Oct. 1, 1973

[21] Appl. No.: 402,302

[52] U.S. Cl. ......... 428/379; 260/78.5 CL; 260/884; 427/44; 427/118; 427/120; 427/358
[51] Int. Cl.² ...................... H01B 3/44; C09D 3/78
[58] Field of Search........... 117/232, 128.4, 132 CF, 117/161 UF, 161 UH; 260/78.5 CL, 884; 428/379; 427/44, 118, 120, 358

[56] References Cited
UNITED STATES PATENTS

| | | | |
|---|---|---|---|
| 2,845,404 | 7/1958 | Garner et al. | 260/78.5 CL |
| 2,958,672 | 11/1960 | Goldberg | 260/884 X |
| 3,010,923 | 11/1961 | Ikeda | 260/884 X |
| 3,141,850 | 7/1964 | Lybeck | 260/884 X |
| 3,230,203 | 1/1966 | Kuhne | 260/78.5 CL |
| 3,242,133 | 3/1966 | Lindsey | 117/161 UF |
| 3,351,604 | 11/1967 | Safford et al. | 260/884 X |

*Primary Examiner*—Harry J. Gwinnell
*Attorney, Agent, or Firm*—J. B. Raden; H. J. Holt

[57] ABSTRACT

A crosslinking composition comprising a blend of at least two polyallylic esters of polycarboxylic acids, one of said esters being a diallylic ester of an alkyl, cycloalkyl, mixed alkyl-cycloalkyl or aralkyl dicarboxylic acid, the other of said esters being a polyallylic ester of an aromatic or heteroaromatic polycarboxylic acid or triallyl ester of isocyanuric acid. The crosslinking compositions are particularly useful as crosslinking coreactants for high temperature processing fluorocarbon polymers. The products resulting from the mixing of fluorocarbon polymers and blends of diallyl esters with triallyl or tetraallyl esters are particularly useful as coatings for wire products.

15 Claims, No Drawings

COATED WIRE PRODUCTS

This invention relates to crosslinking compositions and more particularly to crosslinking compositions comprising blends of at least two polyallylic esters of polycarboxylic acids and to their use as crosslinkers for fluorocarbon polymers.

It has recently been discovered that certain diallylic esters of dicarboxylic acids have a remarkable combination of useful properties for both plasticizing and crosslinking polymeric compositions, particularly high temperature processing fluorocarbons. The diallylic esters act to plasticize the fluorocarbon polymers during their high temperature processing operations and, in addition, produce crosslinked polymers of outstanding chemical, electrical and mechanical properties. The esters of phenyl indan diacarboxylic acid are one such class of diallylic esters. These compounds and their use for this purpose are the subject of U.S. Pat. No. 3,763,222. A second class of diallylic esters useful for this purpose are the esters of alkyl, cycloalkyl, mixed alkyl-cycloalkyl or aralkyl dicarboxylic acids and are shown in our copending U.S. patent application filed of even date herewith Ser. No. 401,973 (now abandoned in favor of divisional application Ser. No. 489,697, filed July 18, 1974.

The crosslinking of a limited group of fluorocarbon polymers such as polyvinylidene fluoride and certain lower temperature processing polyfluorocarbon elastomers, with triallyl esters of cyanuric and isocyanuric acid is known. In addition, the crosslinking of fluorocarbon polymers with the triallyl esters of aryl carboxylic acids is disclosed in U.S. Pat. No. 3,840,619.

The present invention is based upon the discovery that certain blends of polyallylic esters provide unusually excellent overall properties both in the cross-linked product and in its high temperature processing. The particular diallyl esters of our invention contribute outstanding plasticization during high temperature processing and combine with tri or tetraallyl esters to contribute outstanding high temperature mechanical properties and deformation resistance on crosslinking. The properties of the blend are unique and unpredictable from a knowledge of the properties of the unblended individual esters. For example, elongation, and hence flexibility of crosslinked polymers is usually improved only at the expense of deformation resistance in previously known systems. The crosslinker blends of the instant invention, however, produce a combination of elongation and deformation resistance which is considerably above the average of such properties obtained with the individual esters when used alone. Deformation resistance, particularly at elevated temperatures, is of critical importance in many applications, as for example, in wire and cable insulation where deformation is often the greatest cause of failure.

The compositions of the invention comprise a blend of at least two polyallylic esters of polycarboxylic acids, one of the esters being a diallylic ester of a dicarboxylic acid in which the carboxylic groups are connected by an alkyl, cycloalkyl, mixed alkyl-cycloalkyl or aralkyl group, the other of the esters being a polyallylic ester of a carboxylic acid having at least three carboxylic groups connected by an aromatic or heteroaromatic group. The blends are particularly useful for the plasticizing and crosslinking of high temperature processing fluorocarbon polymers.

The diester for use herein may be one of those diallyl esters of dicarboxylic acids set forth in our aforesaid copending application Ser. No. 401,973. As there set forth, these esters can be generally represented by the formula:

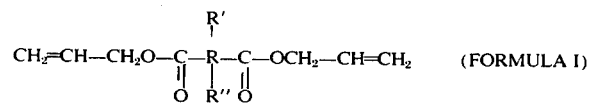
(FORMULA I)

wherein R is an organic radical containing from 4 to 20 carbon atoms and is selected from the group consisting of alkyl radicals, cycloalkyl radicals, mixed alkyl-cycloalkyl radicals and aralkyl radicals: R' and R" are independently selected from hydrogen, alkyl, cycloalkyl, aralkyl and aryl radicals and mixtures thereof; and the total carbon atoms in R, R' and R" is from 10 to 34.

In Formula I, it is preferred, but not necessary for the carbonyl carbon of the allyloxy carbonyl group to be linked to an alkyl carbon. Additionally, when R in Formula I is an aralkyl, or when R' or R" are aryl or aralkyl radicals, it is preferred that the ratio of aromatic carbons to aliphatic (or alicyclic) carbons in R, R' and R" be less than about 3:1, and most preferably less than about 2:1.

Exemplary of preferred diallyl esters for use in the blends of the present invention are the diallyl esters of dodecanoic and brassylic acids. In the latter esters, R is a simple aliphatic chain containing 10 and 11 carbon atoms, respectively, and R' and R" are hydrogen atoms in Formula I above. Other examples of preferred diallyl esters for use in the present invention are those prepared from bis-(dicyclohexane carboxylic acid) where R is a bicycloalkyl radical containing 12 carbon atoms. Esters of "Dimer Acids" are also useful. These are acids produced by the acid catalyzed dimerization of natural 18 carbon fatty acids. In these compounds, R predominantly has a carbon-carbon double bond and an alicyclic ring in the otherwise aliphatic chain. The acid has the generalized structural formula:

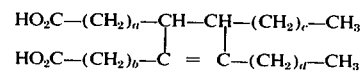

and an ester produced with the acid of Formula II would correspond to the structure of Formula I where R is:

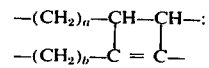

R' is —(CH$_2$)$_c$—CH$_3$; R" is —(CH$_2$)$_d$—CH$_3$; and the sum of a, b, c and d is an integer from 4 to 28.

Other examples of compounds suitable for use in the present invention are the diallyl esters of hexadecanedioic acid; octadecandioic acid; diundecylenic acid; tricyclodecane dicarboxylic acid; p-menthane dicarboxylic acid; 1,2-dicyclohexylethane-4,4'-dicarboxylic acid; 2,2,3,2', 2', 3'-hexamethyldicyclopentyl-3,3'-dicarboxylic acid; 1,2,2-trimethylcyclopentane carboxylic-3-β-propionic acid; methyl homocamphoric acid; β-ethyl homocamphoric acid; 2,6-dibutyl pimelic acid; α-n-octyl sebacic acid; β-methyl-α-allyl adipic acid; 2,2,5,5-tetramethylhexene-3-dicarboxylic acid; 3,4-diisopropyl-hexene-3-α, ω-dicarboxylic acid; α, α, α', α'-tetramethyl-β, β'-diphenyl adipic acid; 2,2,3-trimethyl-3-carboxycyclopentylphenyl acetic acid; 2,6-dibenzylpimelic acid; 1,3-diphenylcyclobutane bis-(α-phenyl propionic acid); 1,4,1', 4'-tetramethyl-5,8,5', 8'-tetrahydrodinaphthyl-2,2'-di-propionic acid; and the like.

A preferred group of diallyl esters for use herein are the aralkyl dicarboxylic acid esters including the phenyl indan dicarboxylic acid esters of the type shown in our above-identified U.S. Pat. No. 3,763,222. A preferred class of such phenyl indan dicarboxylic acid esters is shown by the following structural formula:

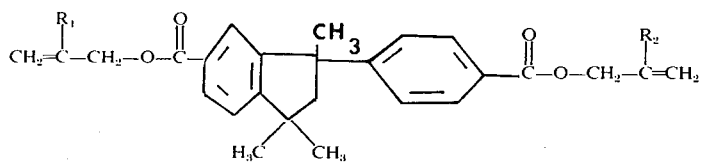

wherein $R_1$ and $R_2$ are independently selected from the group consisting of hydrogen and methyl radicals.

The polyallyl esters present in the blend are preferably triallylic esters of a carboxylic acid containing three or more carboxylic groups. However, tetraallyl esters such as the tetraallyl ester of 1,2,4,5-pyromellitic acid may be employed herein as the polyallyl constituent of the blend.

Illustrative preferred triallyl esters are triallyl esters of aryl polycarboxylic acids and are shown in our above identified U.S. Pat. No. 3,840,619. Examples are triallyl trimesate and triallyl trimellitate. Examples of other triallyl esters which may be used are triallyl isocyanurate; 1,3,5-tris(allyloxycarbonyl) isocyanurate; 1,3,5-tris (allyloxy carbonylethyl) isocyanurate; triallyl esters of 1,3,5-trialkyl trimesic acids; triallyl ester of 5-carboxy-m-phenylene diacetic acid; the triallyl ester of phenylene-1,3,5-triacetic acid; the triallyl ester of 1,3,5-tris (2-carboxyphenyl) benzene; the triallyl ester of 1,3,5-tris (4-carboxyphenyl)benzene; 4,6-bis(2-carboxyphenyl)-O-tolucic acid; the triallyl ester of α, α-bis(4-carboxyphenyl) propionic acid and the like.

We have found that blends of these compounds possess excellent properties as plasticizing and as crosslinking agents for high temperature processing fluorocarbon polymers, including homopolymers and copolymers such as ethylene-tetrafluoroethylene copolymers, ethylene-chlorotrifluoroethylene copolymers, polyvinylidene fluoride homopolymers, tetrafluoroethylene-vinylidene fluoride copolymers, tetrafluoroethylene-hexafluoropropylene copolymers, vinylidene fluoride-hexafluoropropylene copolymers, vinylidine fluoride-hexafluoropropylene-tetrafluoroethylene copolymers and the like and mixtures thereof. The cross-linking agents will normally be added to the fluorocarbon polymer in amounts of about 0.5 to 20 parts by weight per 100 parts by weight of the polymer, preferably 0.5 to 10 parts and even more preferably, 2.5 to 10 parts of crosslinker blend to 100 parts by weight of polymer. The weight of diallyl ester in a preferrred embodiment of our invention should be at least that of the tri- or tetraallyl ester. Normally, the ratio of diallyl ester to tri- or tetraallyl ester crosslinker will range from about 1:4 to 4:1, with a most preferred ratio being about 1:1 to 3.5:1 if diester to tri- or tetraester crosslinking agent.

The following examples illustrate the practice of the present invention. All parts are by weight unless otherwise indicated.

EXAMPLE I

This example and the following two examples illustrate the substantial and unexpected increase in efficiency of crosslinking achieved by employing blends of diallyl and triallyl esters as compared with use of the individual esters.

A polymeric composition (hereinafter Composition A) was prepared by blending an ethylene-tetrafluoco-ethylene copolymer with 3 parts per hundred parts copolymer of a triallyl trimellitate ester. A second polymeric composition (hereinafter Composition B) was also prepared by blending the ethylene-tetrafluoroethylene copolymer with 3 parts per hundred parts copolymer of a diallyl brassylate ester. As will be noted Compositions A and B were prepared as control samples. A third and fourth polymeric composition (hereinafter Compositions C and D) were similarly prepared by blending ethylene-tetrafluoroethylene with blends of triallyl trimellitate and diallyl brassylate. Composition C contained 1.5 parts trimellitate and 1.5 parts brassylate per hundred parts copolymer and Composition D contained 1.0 part trimellitate and 2.0 parts brassylate per hundred parts copolymer. Magnesium oxide in an amount of 1 part per hundred parts copolymer was blended into each of the four compositions.

Each of the blended mixtures was then compression molded with 5 minutes preheat followed by 4 minutes at about 520°–530° F at about 10,000 psi ram pressure. Irradiation of the compression molded compositions was performed to a 10 megarad dose with a 1.5 MEV electron beam accelerator to produce crosslinked polymeric compositions having the following mechanical properties at elevated temperature (250°C):

Table I

| Composition | A | B | C | D |
|---|---|---|---|---|
| Tensile Strength (psi) | 485 | 502 | 408 | 426 |
| Elongation (% at 10"/minute Stretch) | 223 | 409 | 218 | 282 |
| Hot Modulus* (%275°C, 50 psi) | 36 | 97 | 42 | 37 |

*The Hot Modulus indicates the percentage extension of a sample strip of crosslinked polymer after heating the polymeric composition to 275°C, and applying a 50 psi stress to the crosslinked composition while it is above this temperature.

EXAMPLE II

Additional compositons were prepared by the procedure of Example I containing the diallyl ester of brassylic acid or phenyl indan dicarboxylic acid as the diallylic ester in blends with triallyl trimesate as the triallylic ester. As in Example I, the copolymer was ethylene-tetrafluoroethylene. All samples were compression molded and irradiation crosslinked at 10 megarad doses according to the procedure of Example I. The compositions prepared were:

| Composition | Crosslinking Blend |
|---|---|
| E | Diallyl brassylate - 2%<br>Triallyl trimesate - 2% |
| F | Diallyl ester of phenyl indan - 2%<br>Triallyl Trimesate - 2% |
| G | Diallyl ester of phenyl indan - 4%<br>Triallyl trimesate 1% |
| H | Diallyl brassylate - 4%<br>Triallyl trimesate - 1% |

Table II sets forth the mechanical properties of these crosslinked compositions.

Table II

| Composition | E | F | G | H |
|---|---|---|---|---|
| Tensile Strength (psi) | 482 | 453 | 468 | 433 |
| Elongation (% at 10"/minute stretch | 268 | 227 | 261 | 227 |
| Hot Modulus (%, 275°C, 50 psi) | 40 | 34 | 31.5 | 41 |

EXAMPLE III

Further compositions were prepared, compression molded and irradiation crosslinked by the procedures of examples I and II. The compositions prepared were:

| Composition | Crosslinking Blend |
|---|---|
| I(Control) | Triallyl Isocyanurate - 3% |
| J (Control) | " " - 5% |
| K (Control) | Diallyl Ester of Phenyl Indan - 3% |
| L (Control) | " " - 5% |
| M (Control) | Diallyl Brassylate - 3% |
| N | Diallyl Brassylate - 2%<br>Triallyl Isocyanurate - 3% |
| O | Diallyl Ester of Phenyl Indan - 2%<br>Triallyl Isocyanurate - 3% |

The mechanical properties of the resulting crosslinked compositions were as follows:

Table III

| Composition | I | J | K | L | M | N | O |
|---|---|---|---|---|---|---|---|
| Tensile Strength (psi) | 406 | 564 | 396 | 563 | 502 | 450 | 467 |
| Elongation (% at 10"/minute stretch) | 150 | 118 | 380 | 368 | 409 | 102 | 158 |
| Hot Modulus (%, 275°C, 50 psi) | 28 | 17.7 | 79 | 59 | 97 | 15 | 13 |

EXAMPLE IV

This example shows the effectiveness of crosslinked polymeric compositions of the present invention for use as insulation coatings for wires.

A sample comprising ethylene-chlorotrifluoroethylene copolymer and 5.0% triallyl trimellitate and another sample comprising ethylene-chlorotrifluoroethylene copolymer, 4.0% triallyl trimellitate and 1.0% diallyl brassylate were prepared by blending process similar to that shown in Example I. Magnesium oxide in the amount of 1.0% and titanium dioxide pigment in the amount of 0.3% were incorporated into each sample. The resulting samples in powdered form, were then extruded through an extruder having a head temperature of 500° to form rods. The rods were then pelletized and the pellets were extruded onto the surface of a 20 gauge tin coated copper wire. The extrusion conditions for the wire insulation were as follows:

TEMPERATURES (° F)

| BARREL ZONES | | | HEAD | DIE |
|---|---|---|---|---|
| 1 | 2 | 3 | | |
| 450 | 500 | 510 | 520 | 520 |

The two insulated wires were then subjected to 10 and 20 megarad doses of irradiation with high energy electrons by a 1.0 MEV election beam accelerator. The resulting insulated wires with irradiation crosslinked coatings were then annealed and subsequently tested to determine their mechanical and electrical properties. The results of this testing are set forth in the following table:

TABLE IV

| TESTS | ETHYLENE-CHLOROTRIFLUOROETHYLENE WITH 5.0% (BY WEIGHT) TRIALLYL TRIMELLITATE | | ETHYLENE CHLOROTRIFLUOROETHYLENE WITH 4.0% TRIALLYL TRIMELLITATE AND 1.0% DIALLYL BRASSYLATE | |
|---|---|---|---|---|
| | 10 Megarad Dose | 20 Megarad Dose | 10 megarad Dose | 20 Megarad Dose |
| Tensile Strength (psi room temp. at 2"/minute strain | 4715 | 5066 | 8518 | 7826 |
| Elongation (room temp., 2"/minute strain) | 25 | 12 | 125 | 100 |
| Yield (psi, room temp., 2"/minute strain) | 4715 | 5016 | 5066 | 4966 |
| Tape Abrasion ("travel") | 16.8 | 17.4 | 23.7 | 25.5 |
| Tensile Strength (psi of 250° C, 10"/min.) | 70 | 82 | 147 | 89 |

TABLE IV—Continued

| TESTS | ETHYLENE-CHLOROTRIFLU-OROETHYLENE WITH 5.0% (BY WEIGHT) TRIALLYL TRIMELLITATE | | ETHYLENE CHLOROTRIFLU-OROETHYLENE WITH 4.0% TRIALLYL TRIMELLITATE AND 1.0% DIALLYL BRASSYLATE | |
|---|---|---|---|---|
| | 10 Megarad Dose | 20 Megarad Dose | 10 megarad Dose | 20 Megarad Dose |
| Elongation (%, 250° C, 10"/min. | 135 | 70 | 242 | 84 |
| Yield (psi, 250° C, 10"/min. strain) | 70 | 82 | 147 | 89 |
| Hot Modulus (%, 50 psi 250° C) | 80 | — | 62 | — |

EXAMPLE V

Samples comprising ethylene-tetrafluoroethylene copolymer and varying amounts of blends of the diallyl ester of phenyl indan dicarboxylic acid and the triallyl ester of trimesic acid were prepared by a blending process similar to that shown in Example I. The resulting samples had the following compositions on a parts by weight basis:

| Sample | A | B | C |
|---|---|---|---|
| Ethylene-tetrafluoroethylene copolymer | 100 | 100 | 100 |
| Diallyl ester of phenyl indan dicarboxylic acid | 3 | 3 | 5 |
| Triallyl Ester of trimesic acid | 2 | 2 | 3 |
| Magnesium Oxide | 1 | 1 | 1 |
| Titanium Dioxide (Pigment) | 0.3 | 0.3 | 0.3 |

These samples were then extruded through an extruder having a head temperature of 530° F to form rods. The rods were then pelletized and the pellets were extruded onto the surface of tin coated copper wires. The extrusion conditions for the wire insulations were as follows:

| | TEMPERATURES (°F) | | | | |
|---|---|---|---|---|---|
| | BARREL ZONES | | | HEAD | DIE |
| SAMPLE | 1 | 2 | 3 | | |
| A | 580 | 580 | 580 | 625 | 675 |
| B | 580 | 580 | 580 | 625 | 675 |
| C | 500 | 520 | 540 | 600 | 650 |

Sample A was extruded onto an 18 gauge wire having an outside diameter of 0.085 inch and a wall thickness of 0.016 inch. Sample B was extruded onto 18 gauge, 0.087 inch O.D., 0.02 inch wall thickness wire and Sample C was extruded onto 20 gauge, 0.05 inch O.D., 0.006 inch wall thickness wire.

Each of the insulated wires were then subjected to irradiation with high energy electrons by a 1.0 MEV electron beam accelerator. The resulting insulated wires with irradiation crosslinked coatings were then annealed and subsequently tested to determine their mechanical and electrical properties. The results of this testing are set forth in the following table:

TABLE V

| TESTS | SAMPLE A | | SAMPLE B | SAMPLE C | |
|---|---|---|---|---|---|
| | 12 Megarad Dose | 22 Megarad Dose | 10 Megarad Dose | 10 Megarad Dose | 20 Megarad Dose |
| Tensile Strength (psi, room temp., 10" minute strain) | 6591 | 6922 | 5630 | 7817 | 10507 |
| Elongation (room temp., at 10"/minute strain) | 150 | 108 | 143 | 108 | 106 |
| Yield (psi, room temp. at 10"/minute strain) | 4969 | 5011 | 4703 | 5159 | 7090 |
| Tensile Strength (psi, 250°C., 10" minute strain) | 528 | 479 | — | — | — |
| Elongation (at 250°C. 10"/minute strain) | 164 | 97 | — | — | — |
| Yield (psi, 250°C., 10"/minute strain) | 195 | 204 | — | — | — |
| Hot Modulus (%, 275°C., 50 psi) | 23 | 12 | — | — | — |

We claim:

1. A wire product having an extruded insulation coating thereon, said extruded coating comprising a mixture of a fluorocarbon polymer and a blend of at least two polyallylic esters, said polyallylic esters in said blend being incorporated in said mixture in an amount sufficient to promote crosslinking of said polymer, one of said polyallylic esters being a diallylic ester of a dicarboxylic acid in which the carboxylic groups are connected by an organic radical selected from the group consisting of alkyl, cycloalkyl, mixed alkyl-cycloalkyl and aralkyl radicals, and the other of said polyallylic esters being selected from the group consisting of triallyl esters and tetraallyl esters of aromatic or heterocyclic aromatic carboxylic acids and triallyl esters of isocyanuric acid, the ratio of said esters in said blend in such proportions so as to produce a combination of elongation and deformation resistance in said polymer which is greater than the average of such properties obtained with the individual esters when used alone.

2. The wire product of claim 1 wherein the amount of said blend of polyallylic esters incorporated with said fluorocarbon polymer is about 0.5 to about 20 parts by weight per 100 parts by weight of the polymer and the ratio by weight of said diallyl ester in said blend to said other polyallylic ester in said blend is from about 1:4 to 4:1.

3. The wire product of claim 2 wherein the amount by weight of said diallyl ester in said blend is at least equal to the amount by weight of said other polyallylic ester in said blend.

4. The wire product of claim 1 wherein said fluorocarbon polymer is selected from the group consisting of ethylenetetrafluoroethylene copolymers, ethylene-chlorotrifluoroethylene copolymers, polyvinylidene fluoride homopolymers, tetrafluoroethylene-vinylidene fluoride copolymers, tetrafluoroethylene-hexafluoropropylene copolymers, vinylidene fluoride-hexafluoropropylene copolymers, vinylidine fluoride-hexafluoropropylene tetrafluoroethylene copolymers and mixtures thereof.

5. The wire product of claim 1 wherein said diallylic ester comprises a compound having the structural formula:

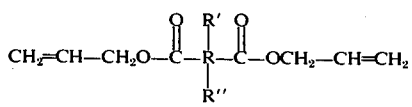

wherein R is an organic radical containing from 4 to 20 carbon atoms and is selected from the group consisting of allkyl radicals, cycloalkyl radicals, mixed allkyl-cycloalkyl radicals and aralkyl radicals; R' and R'' are independently selected from hydrogen, alkyl, cycloalkyl and aralkyl and aryl radicals and mixtures thereof; and the total carbon atoms in R, R' and R'' is from 10 to 34.

6. The wire product of claim 1 wherein said other ester is a triallyl ester of an aryl polycarboxylic acid.

7. The wire product of claim 1 wherein said triallyl ester is selected from the group consisting of triallyl trimesate; triallyl trimellitate; triallyl isocyanurate; 1,3,5-tris (allyloxy-carbonyl) isocyanurate; 1,3,5-tris (allyloxy carbonylethyl) isocyanurate; triallyl esters of 1,3,5-trialkyl trimesic acids; triallyl ester of 5-carboxy-m-phenylene diacetic acid; triallyl ester of phenylene-1,3,5-triacetic acid; triallyl ester of 1,3,5-tris (2-carboxyphenyl) benzene; triallyl ester of 1,3,5-tris (4-carboxyphenyl) benzene; triallyl ester of 4,6-bis (2-carboxyphenyl)-O-toluic acid; triallyl ester of α,α-bis (4-carboxyphenyl propionic acid and mixtures thereof.

8. The wire product of claim 1 wherein said extruded coating is irradiation crosslinked.

9. A wire product coated with a composition comprising a fluorocarbon polymer and a blend of a diallyl ester of a dicarboxylic acid and an allylic ester selected from the group consisting of triallyl and tetraallyl esters of aromatic or heterocyclic aromatic carboxylic acids and triallyl esters of isocyanuric acid, said esters in said blend being incorporated in an amount sufficient to promote crosslinking of said fluorocarbon polymer, the ratio of said esters in said blend in such proportions so as to produce a combination of elongation and deformation resistance in said polymer which is greater than the average of such properties obtained with the individual esters when used alone.

10. The wire product of claim 9 wherein said composition contains about 0.5 to about 20 parts by weight of said blend per 100 parts by weight of said polymer, the ratio by weight of said diallyl ester in said blend to said triallyl or tetraallyl ester in said blend being about 1:4 to about 4:1.

11. The wire product of claim 10 wherein said fluorocarbon polymer is selected from the group consisting of ethylene-tetrafluoroethylene copolymers, ethylene-chlorotrifluoroethylene copolymers, polyvinylidene fluoride homopolymers, tetrafluoroethylene-vinylidene fluoride copolymers, tetrafluoropropylene copolymers, vinylidine fluoride-hexafluoropropylene-tetrafluoroethylene copolymers and mixtures thereof.

12. The wire product of claim 10 wherein said diallylic ester comprises a compound having the structural formula:

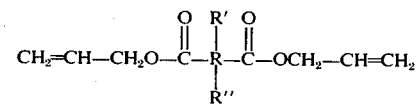

wherein R is an organic radical containing from 4 to 20 carbon atoms and is selected from the group consisting of alkyl radicals, cycloalkyl radicals, mixed alkyl-cycloalkyl radicals and aralkyl radicals; R' and R'' are independently selected from hydrogen, alkyl, cycloalkyl, aralkyl and aryl radicals and mixtures thereof; and the total carbon atoms in R, R' and R'' is from 10 to 34.

13. The wire product of claim 10 wherein said triallyl ester is selected from the group consisting of triallyl trimesate; triallyl trimellitate; triallyl isocyanurate; 1,3,5-tris (allyloxy-carbonyl) isocyanurate; 1,3,5-tris (allyloxy carbonylethyl) isocyanurate; triallyl esters of 1,3,5-trialkyl trimesic acids; triallyl ester of 5-carboxy-m-phenylene diacetic acid; triallyl ester of phenylene-1,3,5-triacetic acid; triallyl ester of 1,3,5-tris (2-carboxyphenyl) benzene; triallyl ester of 1,3,5-tris (4-carboxyphenyl) benzene; triallyl ester of 4,6-bis (2-carboxyphenyl)-O-toluic acid; triallyl ester of α,α-bis (4-carboxyphenyl) propionic acid and mixtures thereof.

14. The wire product of claim 9 wherein said composition is irradiation crosslinked.

15. The wire product of claim 9 wherein said composition is extruded onto the surface of said wire product.

* * * * *